United States Patent [19]
Klotz et al.

[11] Patent Number: 5,222,514
[45] Date of Patent: Jun. 29, 1993

[54] METHOD OF OPERATING A GAS SEALING VALVE AND VALVE EQUIPPED PLASTIC PROCESSING INSTALLATION

[75] Inventors: Bernd Klotz, Gunding; Kurt Herzog, Degersheim, both of Fed. Rep. of Germany

[73] Assignee: Krauss Maffei A.G., Fed. Rep. of Germany

[21] Appl. No.: 773,811

[22] Filed: Oct. 9, 1991

Related U.S. Application Data

[62] Division of Ser. No. 500,301, Mar. 28, 1990, Pat. No. 5,101,858.

[30] Foreign Application Priority Data

Mar. 28, 1989 [DE] Fed. Rep. of Germany ....... 3910025

[51] Int. Cl.$^5$ ............................................ F16K 31/122
[52] U.S. Cl. .......................................... 137/1; 137/493; 137/624.14; 425/563; 425/564
[58] Field of Search ............... 425/562, 563, 564, 566; 137/1, 493, 624.14

[56] References Cited

U.S. PATENT DOCUMENTS

| | | | |
|---|---|---|---|
| 2,016,074 | 10/1935 | Continenza | 137/234.5 |
| 2,480,712 | 8/1949 | Carbon . | |
| 2,836,153 | 5/1958 | Dyson . | |
| 2,940,123 | 6/1960 | Beck et al. | 425/564 X |
| 3,070,126 | 12/1962 | Schneider . | |
| 4,106,887 | 8/1978 | Yasuike et al. | 425/566 X |
| 4,781,554 | 11/1988 | Hendry . | |
| 5,080,570 | 1/1992 | Baxi et al. | 425/563 X |

FOREIGN PATENT DOCUMENTS

| | | |
|---|---|---|
| 2716817 | 8/1978 | Fed. Rep. of Germany . |
| 1096143 | 6/1955 | France . |
| 2139548 | 11/1984 | United Kingdom . |

OTHER PUBLICATIONS

Klamm and Feldmann, "Gasinnendruckverfahren beim Spritzgiessen", Kunststoffe 78 (1988) 9 pp. 767-771.

*Primary Examiner*—Gerald A. Michalsky
*Attorney, Agent, or Firm*—Robert J. Koch

[57] ABSTRACT

A method is disclosed for operating a valve needle for plastic processing plants. The needle valve may be controlled by a control valve, which in turn is controlled by a working gas volume in order to prevent formation of internal waviness in injection molded articles even under very high gas pressures and to assure high flexibility in production without refitting delays. During plastic mass injection the valve needle seals tightly. During gas return the valve needle remains open until the gas bubble in the mold cavity is completely emptied.

14 Claims, 2 Drawing Sheets

METHOD OF OPERATING A GAS SEALING VALVE AND VALVE EQUIPPED PLASTIC PROCESSING INSTALLATION

This is a divisional application of application Ser. No. 07/500,301 filed Mar. 28, 1990, now U.S. Pat. No. 5,101,858.

BACKGROUND OF THE INVENTION

1. Field of the Invention

The invention relates to a gas sealing valve for a plastic processing installation and a process to control a plastic processing plant equipped with a gas sealing valve.

2. Description of the Related Technology

In order to produce closed cavity plastic injection moldings it is only necessary to fill a molding tool mold cavity with an amount of plasticized plastic material sufficient to cover the cavity walls to the desired wall thickness. During molding, a gas bubble is formed in a partially filled mold cavity by injection of gas under a pressure of up to 1000 bar and more. The plastic material is injected and pressed on all sides against the walls of the mold cavity. As soon as the plastic material is applied against the walls, the injected gas is returned into a pressure tank in order to conserve and prevent environmental contamination by the gas. The injection molding opening is usually a hollow sprue sealed by introduction of plasticized plastic material following the gas return.

A metering head with a sealing needle valve is applied to the outlet of the mold cavity of the tool for metered injection of the plasticized plastic material. It would be conceivable to provide the valve sealing needle with an axial gas channel connected to the gas tank by an external gas sealing valve for the additional injection of gas. However, if the flow of gas is shut off, plasticized plastic material may penetrate into such a gas channel. This material is thrown into the mold cavity and may lead to formation of internal waviness in the finished injection molding. Furthermore, the axially drilled sealing needle must be replaced with a sealing needle without an axial bore, whenever the injection molding machine is to be used for the production of moldings with a solid fill (i.e. without gas injection).

SUMMARY OF THE INVENTION

An object of the invention is to provide a gas sealing valve which safely prevents formation of waviness even under very high gas pressures, around 1000 bar, and which requires no refitting for the production of solid moldings.

According to the invention this object may be attained by a gas sealing valve for a plastic processing installation with a stationary valve housing built into the tool or forming a mobile sealing needle of a needle type shut-off nozzle installed in the head of the plastic injection molding machine.

A valve needle may be displaceably supported in the valve housing under spring prestressing. The valve needle together with the valve housing preferably defines a valve seat. If the valve needle is closed the valve seat tightly seals against an externally applied plastic mass.

A control piston is freely movable and is located in the valve housing within an axial elongation of the valve needle. The piston encloses a working volume against a gas pressure system while allowing a predefined leakage. The pressure system may include a gas pressure generator and storage part or tank(s). Gas feeder lines connect the head of the injection molding machine and/or the tool to the gas pressure system to provide a gas bubble injected into the partially filled tool. The control piston diameter may be larger than the valve needle diameter. The gas pressure of the gas pressure system axially acts on the needle in the gas injection phase in the opening direction against the pressure of the plasticized plastic mass and the spring prestressing. The control piston acts on the needle during the return of the gas of the gas bubble to the gas pressure system in the opening direction against the pressure of the gas bubble injected in the tool and the spring prestressing.

The plastic processing plants may be controlled in certain technical applications by manipulating the gas sealing valves in order to deaerate the working volume within a predetermined period of time following the termination of the return of the gas phase for effecting an accelerated resetting of the control piston and of the valve needle into their initial position closing the valve seat.

The opening of the blank surrounding the gas bubble may be sealed by injection of a predetermined quantity of the plasticized mass (sprue sealing), following deaeration of the working volume.

According to the invention a structurally simple seal for an axial gas conducting channel in a sealing needle is provided. The channel seal must safely operate even under an extremely high pressure of around 1000 bar. The gas sealing valve according to the invention may be built into the sealing needle of the metering head of a plastic injection molding machine and/or the injection molding tool itself.

The invention is described hereinbelow by a fundamental embodiment with reference to the drawings.

DETAILED DESCRIPTION OF THE PREFERRED EMBODIMENT

Figure 1:
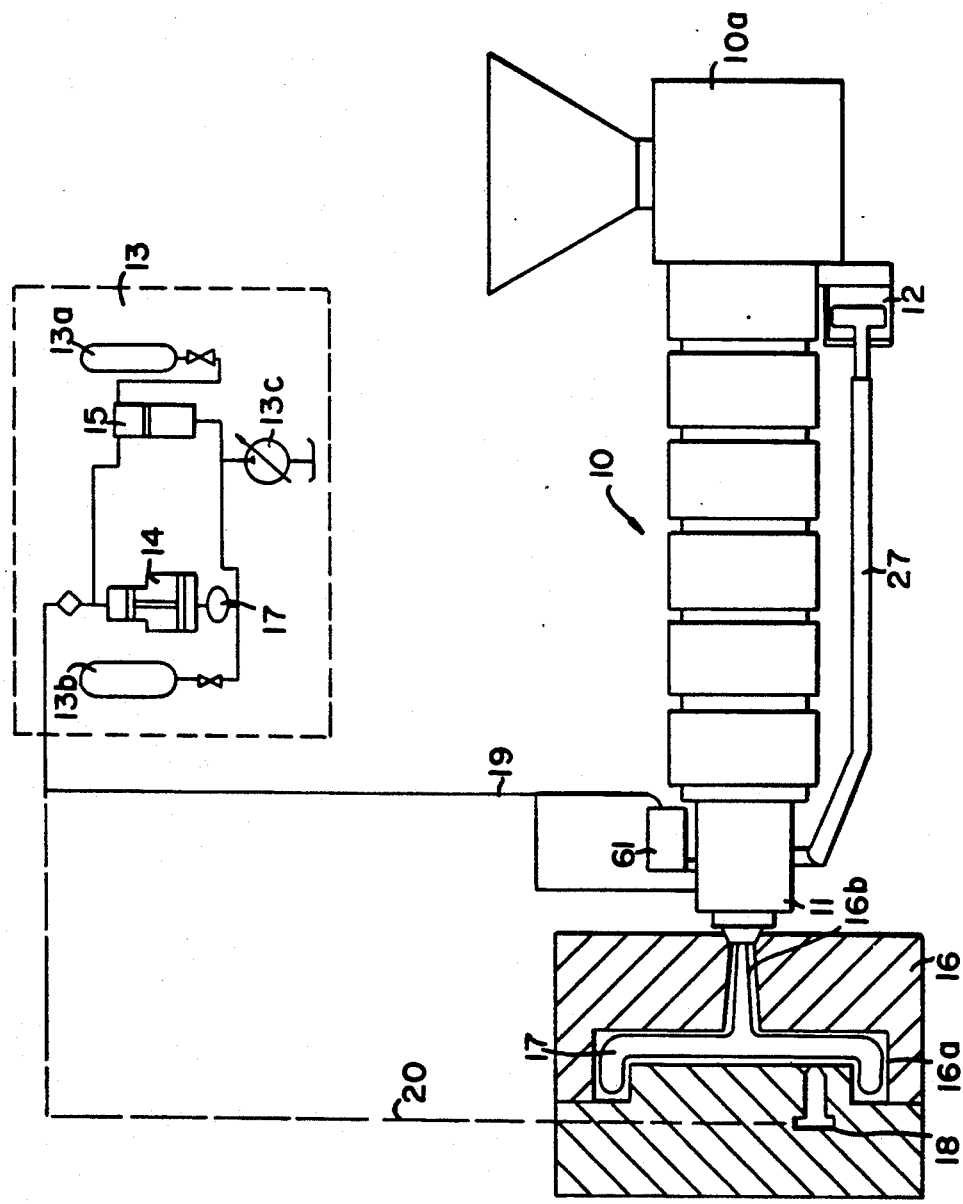
FIG. 1 shows a schematic diagram of a plastic processing plant, equipped with the gas sealing valve in two alternative installed positions.

The plastic processing plant designated 10 in FIG. 1, includes a plastic injection molding machine 10a, a two-part tool 16 and a gas pressure system 13 with the gas tanks 13a, 13b for an inert pressurizing gas, for example nitrogen, that may be under a pressure of up to 1000 bar and more. The injection molding machine 10a has a metering head 11 at its outlet end. The metering head 11 is controlled by a hydraulic drive apparatus 12.

The gas tanks 13a, 13b are connected to pressure accumulators 14, 15 charged by a variable volume pump 13c. A proportional valve 17 is located in the pressure loading circuit. Gas pressure is controlled by a mass pressure transducer 70 (FIG. 2) as a function of the pressure of the exiting plastic mass in the alternative gas feeders 19, 20. The gas feeders 19, 20 lead to a gas sealing valve 18, shown in more detail in FIGS. 2 and 3. The sealing valve may be built into the metering head 11 or the tool 16. If installed in the tool 16, the gas sealing valve 18, as shown in FIG. 1, opens directly into the mold cavity 16a of the tool 16. When installed in the metering head 11, the gas sealing valve 18 opens into a runner 16b of the tool 16.

Figure 3:
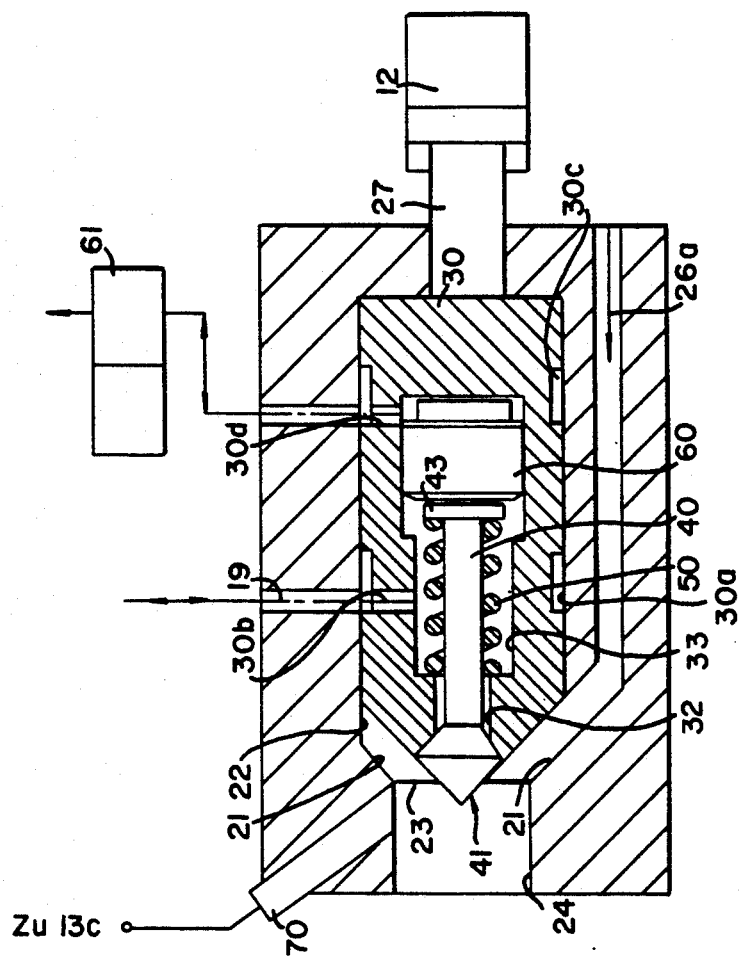
FIG. 3 shows a longitudinal section through the gas sealing valve of FIG. 2 in the closed operating state.
Figure 2:
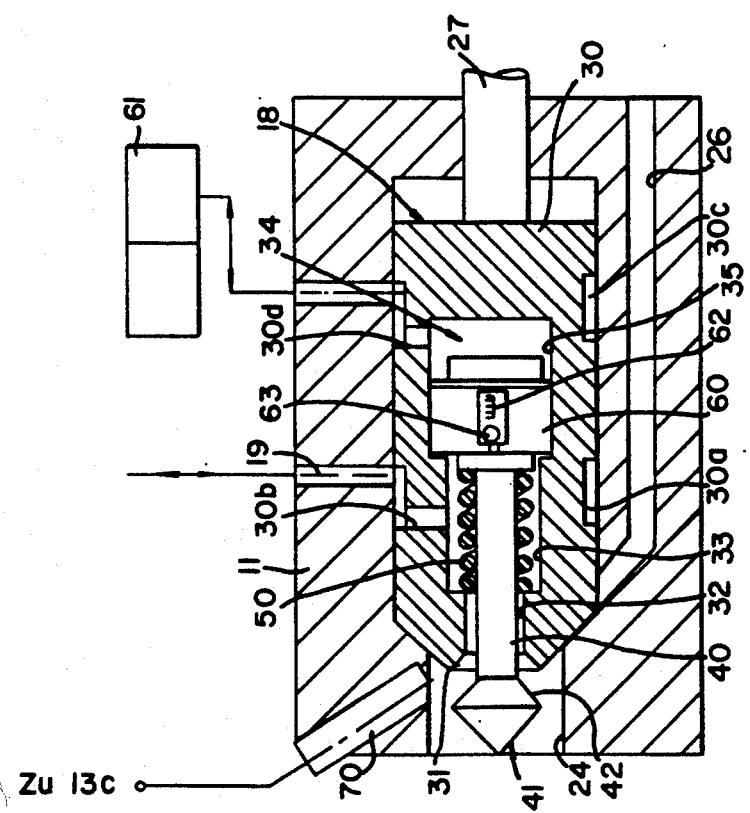
FIG. 2 shows a longitudinal section through a gas sealing valve of the invention in the open operating state.

In the embodiment illustrated in FIGS. 2 and 3, the gas sealing valve 18 includes a valve housing 30 and a reversing sealing needle of a needle sealing valve for the metering head 11. The forward end of the cylindrical valve housing 30 is conically tapered to define a corresponding conical surface 21 of the cylindrical metering head bore 22. A tightly sealing valve seat for the plasticized plastic material is located at the transition 23 of the metering head bore into the cylindrical outlet opening 24. The plasticized plastic material is supplied to the metering head bore 22 by the extruder of the plastic injection molding machine 10a through a channel 26 in the direction of the arrow 26a. The cylindrical outlet opening 24 passes flush into the runner 16b of the tool 16 (FIG. 1). The valve housing 30 is axially reciprocated within the axial bore 22 of the metering head by the hydraulic driving apparatus 12. A mechanical linkage 27 connects the valve body 30 to the hydraulic apparatus 12.

The pressure of the plasticized plastic mass is measured in the transition area 23 by the mass pressure transducer 70. The pressure signal of the transducer is connected to the proportional valve 17 (FIG. 1) for the mass pressure dependent control of gas pressure.

The reciprocal motion of the gas sealing valve 18 in the bore 22 of the metering head is carried out by the hydraulic driving apparatus linkage 27.

A cylindrical outer surface of the valve housing 30 displays a first annular groove 30a to connect the reversing gas sealing valve 18 to the gas feeder 19. The length of the groove corresponds to the stroke of the gas sealing valve 18 in the bore 22 of the metering head. Preferably the gas feeder 19 and a radial channel 30b within the valve housing 30 are connected in all positions of the gas sealing valve 18. The two extreme positions of the valve housing 30 are shown in FIGS. 2 and 3.

The valve housing 30 for the gas sealing valve 18 contains a multiple step axial blind hole. The largest diameter of the hole is at its bottom and the smallest is at its opening in the area of the conically tapering forward end of the valve housing 30. Three cylindrical chambers are formed within the valve housing 30 by the stepping of the hole diameter. A front chamber 32, an intermediate chamber 33 and a rear chamber 35 are defined.

A working gas tank 61 opens into the rear chamber 35. The tank 61 is supplied by the gas feeder 19. A second annular groove 30c is located on the cylindrical outer surface of the valve housing in order to maintain a connection between the working gas tank 61 and the rear chamber 35 in all positions of the gas sealing valve 18. The valve housing 30 has a second annular groove 30c on its cylindrical outer surface. The second annular groove 30c is connected to the rear chamber 35 by a connecting channel 30d.

A displaceable control piston 60 is located in the rear chamber 35. The connecting channel 30d opens to the reverse side or rear of the control piston 60 into the rear chamber 35. The reverse side or rear end of the control piston 60 has a turned groove with a shoulder which terminates flush with the front edge of the connecting channel 30d to insure a pressure force acting on the reverse piston surface in the rear terminal position of the control piston 60 (see FIG. 3). A working gas volume 34 is located in the rear of chamber 35. The control piston 60 seals the working gas volume 34 and the working gas tank 61 against the gas pressure system 13. The connecting channel 30b opens into the intermediate chamber 33 and produces force acting on the frontal surface of the control piston against the pressure force of the working gas volume 34. However, the control piston 60 does not completely seal off the working gas volume 34 against the gas pressure system 13. In order to create a predetermined leakage between the chambers 33 and 35 the control piston 60 has a defined gap (not shown) toward the valve housing 30. A bore 62 is provided in the center of the control piston 60. A check valve 63 is located in the bore 62 so that the gas pressure in front and behind the control piston 60 is the same in the static state.

A valve needle 40 is located in the front and the intermediate chambers 32 and 33. The valve needle has a double conical head 41 which forms a mass tight valve seat with the conically expanded opening 31 of the front chamber 32 in connection with the rear conical surface 42 of the head. The frontal conical surface of the needle valve head 41 forms a continuous, closed circular cone with the conically tapering front end of the valve body 30 when the valve seat is closed (FIG. 3). In this position the chambers 32, 33, 35 and thus the gas pressure system 13 are reliably sealed against penetration by the plasticized plastic mass. The plastic mass flows through the channel 26 and the open valve seat, between the housing of the metering head 11 and the retracted valve body 30, into the runner 16b of the mold cavity 16a.

A compression spring 50 is located in the intermediate chamber 33. The compression spring 50 surrounds the shaft of the valve needle 40 and is supported by a shoulder at the transition of the chambers 32, 33, and against a pressure plate 43 mounted on the rear end of the valve needle 40. The compression spring 50 prestresses the valve needle 40 in the closing direction, so that the valve needle 40 opens only if:

a) the pressure acting on the needle in the chamber 33 is higher than the sum of the mass pressure on the valve needle head 41 and the spring prestressing (in a position of the control piston 60, in which the control piston 60 is not abutting against the pressure plate 43) during gas input, or b) the control piston 60 is exposed to a pressure difference large enough so that it moves against the pressure plate 43 and the valve needle 40 is displaced against the spring prestressing and the pressure of the plastic mass on the valve needle head 41 during gas return.

The aforementioned alternative possibilities (a) and (b) for opening of the valve needle 40 are discussed in more detail in the following:

During the gas input of phase (a), the pressure gas arrives from the gas feeder 19 through the chambers 33 and 35 and opens the valve needle 40 (FIG. 2) in the center of the plasticized plastic mass previously introduced in the mold cavity 16a. The closed valve seat between the valve body 30 and the conical surface 21 of the bore 22 of the metering head interrupts the mass supply during gas introduction. A gas bubble 17 is formed due to introduction of the gas, into the mold cavity 16a. During gas introduction the pressure gas also passes through the bore 62, against the resetting force of the check valve 63, and through the defined gap between the piston 60 and the housing 30, into the rear chamber 35 and from there into the working tank 61. The pressure is then equal in front and behind the control piston 60.

Following completion of the gas introduction, the pressurizing gas collected in the gas bubble must be returned into the gas pressure system 13. Initially, upon depressurizing the inlet lines, the valve needle 40 is moved into the closing position by the prestress of the compression spring in order to deareate the gas pressure system 13. Then the higher pressure in the working gas volume 34 moves the control piston 60 against the valve needle 40, whereupon it reopens the valve needle 40. The gas may then flow from the gas bubble 17 into the gas pressure system 13. The gas of the working gas volume 34 can only flow through the defined gap between the control piston 60 and the valve housing 30 into the gas pressure system 13. The control piston 60 therefore, remains in its position opening the valve needle 40 as long as there is gas in the gas bubble 17 where there is a pressure difference relative to the gas feeder 19. This signifies that the valve needle 40 remains open until the gas has been returned completely from the tool 16 into the gas pressure system 13 and the gas tanks 13a, 13b. If any residual pressure is still present, the working gas tank 61 may be deaerated through a venting valve to a tank or the environment. The gas sealing valve 18 is then in its initial position, and the next filling of the tool may be initiated by retracting the gas sealing valve 18 into the position according to FIG. 3.

What I claim is:

1. A method of using a gas sealing valve exhibiting an orifice, an intermediate chamber and a rear chamber, comprising the steps of:
   feeding pressurized gas into the gas sealing valve from a gas pressure system;
   building up pressure in the gas sealing valve to move a valve needle within the gas sealing valve from a sealed position to an open position including the steps of leaking a predetermined amount of pressurized gas from the intermediate chamber into the rear chamber, and building up pressure in the rear chamber of the gas sealing valve;
   feeding pressurized gas in a first direction through the gas sealing valve into a valve port; and
   feeding pressurized gas in a second, different direction into the gas sealing valve from the valve port.

2. A method according to claim 1 wherein the step of building up pressure in the gas sealing valve further comprises the step of:
   building up pressure in the intermediate chamber of the gas sealing valve.

3. A method according to claim 1, further comprising the step of:
   moving a control piston within the gas sealing valve in response to the pressure buildup in the gas sealing valve.

4. A method according to claim 1, wherein the step of building up pressure in the gas sealing valve further comprises the step of:
   moving a control piston in response to the pressure buildup in the rear chamber.

5. A method according to claim 1, wherein the step of building up pressure in the gas sealing valve further comprises the step of:
   moving a control piston into contact with the valve needle in response to the pressure buildup in the rear chamber.

6. A method according to claim 1, further comprising the steps of:
   moving the valve needle to a sealed position after the step of feeding pressurized gas in the first direction; and
   moving the valve needle toward an open position in response to the pressure buildup in the rear chamber prior to the step of feeding pressurized gas in a second, different direction.

7. A method according to claim 1, further comprising the step of:
   moving a control piston in the first direction in response to the pressure buildup in the rear chamber.

8. A method according to claim 7, further comprising the step of:
   moving the control piston into contact with the valve needle in response to the pressure buildup in the rear chamber.

9. A method according to claim 7, further comprising the step of:
   moving the valve needle in the first direction in response to the control piston movement.

10. A method of using a gas sealing valve including a valve needle and a multi-chamber valve housing exhibiting an orifice, an intermediate chamber and a rear chamber; said method comprising the steps of:
    feeding pressurized gas from a gas pressure system into the gas sealing valve;
    building up pressure in the rear chamber;
    moving the valve needle to an open position;
    feeding pressurized gas from the gas sealing valve into a valve port;
    moving the valve needle to a sealed position;
    moving a control piston into contact with the valve needle in response to the pressure buildup in the rear chamber;
    moving the valve needle toward an open position in response to the pressure buildup in the rear chamber; and
    receiving pressurized gas through the orifice from a valve port.

11. A method according to claim 10 wherein the step of moving the valve needle toward an open position further comprises the step of:
    moving the valve needle toward an open position in response to the control piston's movement.

12. A method according to claim 10 further comprising the step of:
    stopping a flow of pressurized gas from the gas pressure system into the gas sealing valve prior to the step of moving the valve needle toward an open position in response to the pressure buildup in the rear chamber.

13. A method according to claim 10 further comprising the step of:
    leaking a predetermined amount of pressurized gas from the intermediate chamber into the rear chamber.

14. A method according to claim 10, wherein the step of building up pressure in the rear chamber further comprises the steps of:
    leaking a predetermined amount of pressurized gas from the intermediate chamber into the rear chamber; and
    building up pressure in the rear chamber in response to the step of leaking a predetermined amount of pressurized gas.

* * * * *